US008750726B2

(12) United States Patent
Geyer (10) Patent No.: US 8,750,726 B2
(45) Date of Patent: Jun. 10, 2014

(54) HISTOGRAM-BASED CHROMATIC DISPERSION ESTIMATION

(75) Inventor: Jonas Geyer, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 325 days.

(21) Appl. No.: 13/210,458

(22) Filed: Aug. 16, 2011

(65) Prior Publication Data

US 2013/0045004 A1 Feb. 21, 2013

(51) Int. Cl.
*H04B 10/06* (2006.01)

(52) U.S. Cl.
USPC ............................. 398/208; 398/209; 398/210

(58) Field of Classification Search
None
See application file for complete search history.

(56) References Cited

U.S. PATENT DOCUMENTS

| | | | |
|---|---|---|---|
| 7,031,613 | B1 | 4/2006 | Mazzini et al. |
| 2004/0086276 | A1 | 5/2004 | Lenosky et al. |
| 2005/0196176 | A1* | 9/2005 | Sun et al. ...................... 398/152 |
| 2007/0014850 | A1 | 1/2007 | Manikandan et al. |
| 2009/0003837 | A1 | 1/2009 | Piciaccia et al. |

FOREIGN PATENT DOCUMENTS

EP 1630982 A1 * 3/2006

OTHER PUBLICATIONS

Cable, "Calibration: A Technician's Guide", 2005, ISA—Instumentation, System and Automation Society, pp. 1-8.*
Kuschnerov et al., "Adaptive Chromatic Dispersion Equalization for Non-Dispersion Managed Coherent Systems", Federal Armed Forces University Munich, Institute for Communications Engineering, Neubiberg, Germany, Optical Society of America, 2009, (3 pages).
Kuschnerov et al, "DSP for Coherent Single-Carrier Receivers", Journal of Lightwave Technology, vol. 27, No. 16, Aug. 15, 2009, (pp. 3614-3622).
Hauske et al., "Frequency Domain Chromatic Dispersion Compensation Filter Adaptation", European Research Center, Huawei Technologies Co., Ltd., Oct. 28, 2009, (8 pages).
Hauske et al., "Frequency Domain Chromatic Dispersion Compensation Filter Adaptation", Huawei Technologies Duesseldorf GmbH, European Research Center, Munich, Germany, OSA / OFC/NFOEC 2010, (3 pages).
Hauske et al., "Fast and Reliable Frequency-Domain CD Estimation", Huawei Technologies Duesseldorf GmbH, European Research Center, Munich, Germany, OSA / SPPCom 2010, (2 pages).
Extended European Search Report in counterpart European Application No. 12005725.2, mailed Feb. 13, 2013.
Soriano et al., "Chromatic Dispersion Estimation in Digital Coherent Receivers," IEEE, Journal of Lightwave Technology, vol. 29, No. 11, Jun. 1, 2011, pp. 1627-1637.
Haunstein et al., "Principles for Electronic Equalization of Polarization-Mode Dispersion," IEEE, Journal of Lightwave Technology, vol. 22, No. 4, Apr. 1, 2004, pp. 1169-1182.

* cited by examiner

*Primary Examiner* — Darren E Wolf
(74) *Attorney, Agent, or Firm* — Edell, Shapiro & Finnan, LLC (57) ABSTRACT

Techniques are provided for estimation of the chromatic dispersion (CD) in an optical signal received by an optical receiver. The techniques involve iteratively adjusting dispersion compensation coefficients of one or more filters configured to compensate for the CD in the received optical signal. At each iteration of the dispersion compensation coefficient adjustment, electrical domain signals are filtered to generate digitally-filtered signals. The electrical domain signals are generated based on the received optical signal. Also at each iteration of the dispersion compensation coefficient adjustment, an amplitude histogram of the digitally-filtered signals is generated. The amplitude histograms generated at each iteration are evaluated to generate an estimate of the chromatic dispersion in the received optical signal.

21 Claims, 9 Drawing Sheets

HISTOGRAM-BASED CHROMATIC DISPERSION ESTIMATION

TECHNICAL FIELD

The present disclosure relates to estimating the amount of chromatic dispersion in an optical signal.

BACKGROUND

Optical communication involves the transmission of data in which light is used as the transmission medium. An optical communication system comprises an optical transmitter, a channel (e.g., an optical fiber), and an optical receiver. The optical transmitter encodes data onto an optical signal (light wave), the channel carries the optical signal from the transmitter to the receiver, and the receiver extracts the data from the received optical signal.

One specific type of optical communication is coherent optical communication. In coherent optical communication, the transmitter encodes the data onto the electrical field of the optical signal. At the receiver, the data is extracted through direct measurement of the complex electrical field.

DESCRIPTION OF EXAMPLE EMBODIMENTS

Overview

Techniques are provided for estimation of the chromatic dispersion in an optical signal received by an optical receiver. The techniques involve iteratively adjusting dispersion compensation coefficients of one or more filters configured to compensate for the chromatic dispersion in the received optical signal. At each iteration of the dispersion compensation coefficient adjustment, electrical domain signals are filtered to generate digitally-filtered signals. The electrical domain signals are generated based on the received optical signal. Also at each iteration of the dispersion compensation coefficient adjustment an amplitude histogram of the digitally-filtered signals is generated. The amplitude histogram generated at each iteration are evaluated to generate an estimate of the chromatic dispersion in the received optical signal. This estimation may be used to identify the dispersion compensation coefficients that enable the one or more filters to substantially compensate for CD in the received optical signals.

Example Embodiments

Figure 1:
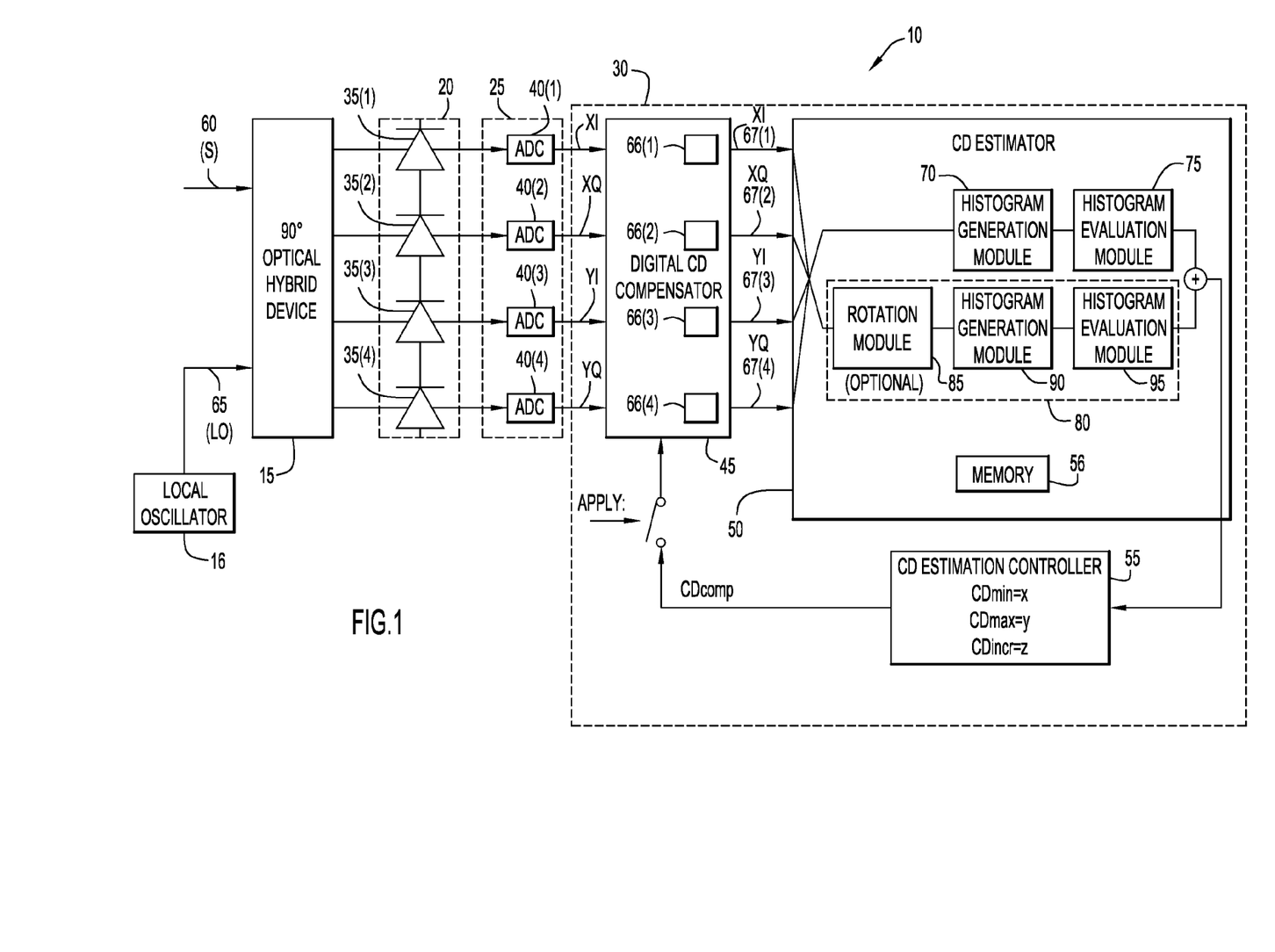
FIG. 1 is a block diagram of a coherent optical receiver configured to use histogram-based techniques to estimate the chromatic dispersion (CD) in a received optical signal.

FIG. 1 is a block diagram of a coherent optical receiver 10 comprising a 90° optical hybrid device 15, a local oscillator 16, a photoelectric conversion stage 20, an analog-to-digital (ADC) conversion stage 25, a digital signal processing (DSP) stage 30, controller 55 and memory 56. Photoelectric conversion stage 20 comprises four photodiodes 35(1)-35(4), ADC conversion stage 25 comprises four analog-to-digital converters (ADCs) 40(1)-40(4), and DSP stage 30 comprises, among other components, a digital chromatic dispersion (CD) compensator 45, and a CD estimator 50. CD estimator comprises a histogram generation module 70 and a histogram evaluation module 75. In the example of FIG. 1, CD estimator 50 also includes an optional estimation module 80 comprising rotation module 85, histogram generation module 90, and histogram evaluation module 95.

In coherent optical communication, a transmitter encodes data onto the electrical field of an optical signal (light wave). A coherent optical receiver, such as receiver 10 of FIG. 1, is configured to extract the encoded data through direct measurement of the complex electrical field of the received signal. In the example of FIG. 1, an optical signal (S) shown at reference numeral 60 encoded with data by an optical transmitter and sent on an optical fiber (not shown in FIG. 1) is received by 90° optical hybrid device 15. The 90° optical hybrid device 15 is, for example, a six-port (two input ports, four output ports) device that mixes optical signal 60 with a reference light signal (LO) 65 generated by local oscillator 16 that may be part of receiver 10. More specifically, 90° optical hybrid device 15 mixes optical signal 60 with the reference light signal 65 in the complex-field space.

The 90° optical hybrid device 15 outputs two pairs of light signals (i.e., four light signals) comprising two polarizations, each with a real and imaginary component (I and Q). That is, the two pairs have optical phases different (offset) by 90° and represent the real and imagery parts of the received data. The two pairs of light signals are provided to two pairs of detectors in the form of photodiodes 35(1)-35(4) that convert the optical signals to the analog electrical domain. The output of photodiodes 35(1)-35(4) are sampled by respective ADCs 40(1)-40(4) in ADC conversion stage 25 to yield raw multi-bit digital signals XI, XQ, and YI, YQ, corresponding to In-phase (I) and Quadrature (Q) components of each of the received polarizations (X, Y) in signal 60. These digital signals are then provided to DSP stage 30.

For ease of illustration, techniques are described herein with two pairs of signals comprising XI, XQ and YI, YQ. However, it is to be appreciated that the techniques described herein may alternatively be implemented with a single-polarization coherent receiver, which would use only one pair of optical signal (e.g. XI and XQ). Additionally, it is to be appreciated that the elements shown in FIG. 1 to generate the digital signals (i.e., XI, XQ, YI, YQ or XI and XQ) are merely illustrative and do not limit the techniques described herein. That is, the techniques described herein may be used to estimate the CD in an optical received and converted to baseband through any number of different receivers, where the arrangement of FIG. 1 is merely an example thereof.

As noted above, receiver 10 uses measurement of the complex field of the received signal 60 to properly recover the transmitted data. In order to perform reliable measurement, the reference light signal 65 should be locked in both phase and polarization with the incoming data. However, because the state of polarization of optical signal 60 may be scrambled during transmission through the channel, dynamic control of the state of polarization of the optical signal 60 is needed so that it matches that of the reference signal 65. This phase and polarization management is realized in the electrical domain by DSP stage 30. For ease of illustration, the modules used for, e.g., polarization management/tracking are not shown in DSP stage 30 of FIG. 1.

One factor that contributes to the proper recovery of the data transmitted in optical signal 60 is compensation for the chromatic dispersion (CD) in the optical signal. CD leads to, for example, broadening of pulses of the optical signal 60 as it travels down the length of the transmission channel (e.g., optical fiber). CD consists of both material dispersion and waveguide dispersion. Both of these phenomena occur because optical signals have a finite spectral width, and different spectral components will propagate at different speeds along the length of the optical fiber. The effect of CD on the signal should be compensated in order to be able to receive the transmitted information properly.

To compensate for the CD in optical signal 60, DSP stage 30 includes a digital CD compensator (equalizer) 45. CD compensator 45 includes, for example, a plurality of Finite Impulse Response (FIR) digital filters 66(1)-66(4) each having an adjustable dispersion compensation coefficient. The level of the dispersion compensation coefficients control the amount of CD compensation that is performed by the digital filters 66(1)-66(4). As such, in order for CD compensator 45 to properly compensate for the CD in signal 60, the dispersion compensation coefficients need to be set to an appropriate level (i.e., the amount of CD needs to be estimated at start-up in order to set the initial coefficients of filters 66(1)-66(4)). The appropriate level is determined by estimating the CD in signal 60 through the use of a histogram-based technique, and setting the dispersion compensation coefficients to levels (values) that compensate for the estimated CD.

FIG. 1 illustrates an example in which four digital filters 66(1)-66(4) are shown. It is to be appreciated that the use of four digital filters 66(1)-66(4) is merely illustrative and that CD compensator 45 may include different combinations of digital filters (more or less than four).

CD compensator 45 outputs four digitally filtered signals 67(1)-67(4) that are sampled by CD estimator 50. More specifically, histogram generation module 70 in CD estimator 50 obtains a number of samples of each of signals 67(1)-67(4). Using these samples, histogram generation module 70 generates a histogram of the amplitudes of each of signals 67(1)-67(4) over a predetermined time period. Such histograms are referred to as amplitude histograms.

Chromatic dispersion affects the statistical properties of the four signal-tributaries which are captured by the ADCs 40(1)-40(4). More specifically, when a large amount of CD remains in signals 67(1)-67(4), the generated amplitude histograms have a distribution that closely matches a Gaussian distribution, while a small amount of CD remaining in signals 67(1)-67(4) will cause the generated amplitude histograms to have a distribution that greatly deviates from a Gaussian distribution. Stated otherwise, if CD compensator 45 fails to adequately compensate for the CD, histograms generated based on the amplitudes of the digitally-filtered signals 67(1)-67(4) will have a Gaussian distribution. Conversely, if CD compensator 45 substantially compensates for the CD, histograms generated based on the amplitudes of the digitally-filtered outputs of CD compensator 45 will have a non-Gaussian distribution. As such, the effectiveness of CD compensator 45 may be determined by evaluating the degree of Gaussian (i.e., "Gaussianity") of the generated histograms. Histograms that have a Gaussian distribution indicate that the CD compensator 45 is not adequately compensating for the CD, while histograms that do not have a Gaussian distribution indicate that CD compensator 45 has, at least partially, compensated for the CD. As such, histogram evaluation module 75 is used to determine how closely the distributions of the generated histograms match a Gaussian distribution.

In operation, digitally filtered signals 67(1)-67(4) are initially generated by CD compensator 45 having the dispersion compensation coefficients of filters 66(1)-66(4) each set to a predetermined level that may or may not adequately compensate for the CD in received signal 60. In order to determine which levels for the dispersion compensation coefficients will best compensate for the CD in received signal 60, the CD in received signal is estimated through an iterative process.

This iterative process is controlled by CD estimation controller 55. More specifically, the dispersion compensation coefficients are set to a predetermined first level (CDmin), and iteratively adjusted by a predetermined amount (CDincr) until a final level (CDmax) is reached. At each iterative adjustment, the dispersion compensation coefficients are configured such that CD compensator 45 compensates for different amounts of CD in the digital signals. That is, each level of the dispersion compensation coefficients is configured to enable CD compensator 45 to compensate for a predetermined amount of CD (e.g., a first level compensates for 1000 picoseconds/nanometer (ps/nm), while a second level compensates for 2000 ps/nm, and so on). As such, the levels of the dispersion compensation coefficients may be expressed in terms of the amount CD for which the coefficients are configured to compensate.

At the first level, and each other level for the dispersion compensation coefficients (i.e., at each iteration), a signal is filtered by filters 66(1)-66(4) (using the current dispersion compensation coefficients) and histograms are generated by histogram generation module 70. As noted above, the deviation of each histogram distribution from a Gaussian distribution is determined at histogram evaluation module 75. Because each of the different dispersion compensation coefficient values allow the digital filters 66(1)-66(4) to compensate for different amounts of CD, one set of coefficients will provide compensation that is superior to that of the other coefficients. In order to determine which filter coefficients are the best (i.e., provide the ability for maximum compensation), the compensation provided at an iteration is compared to the compensation provided at the other iterations. This comparison is facilitated through the use of a cost function. More specifically, at each iteration, the cost function generates a numerical value representing the deviation or difference of the histogram distributions from a Gaussian distribution. A maximum numerical value generated by the cost function reflects the iteration (and thus the dispersion compensation filter coefficients) at which CD compensator 45 best compensates for the CD in received signal 60. As such, the values for the dispersion compensation coefficients at this iteration are selected as the filter coefficients for use by CD compensator 45 for subsequent use in filtering signals. Controller 55 may then apply these selected dispersion compensation coefficients to filters 66(1)-66(4) for subsequent use.

In the example of FIG. 1, CD estimator 50 further comprises an optional estimation module 80 comprising a module to digitally-modify digitally filtered signals 67(1)-67(4) output by CD compensator 45. In the example of FIG. 1, this digital modification is performed by rotation module 85. Further details of the digital modification are provided below. Optional estimation module 80 further comprises a histogram generation module 90, and a histogram evaluation module 95. Rotation module 85 samples digitally filtered signals 67(1)-67(4) output by CD compensator 45, and rotates the polarization of these signals by a predetermined amount. In FIG. 1, rotation module 85 is configured to rotate the polarization of the signals by 45 degrees. Histogram generation module 90 is configured to generate amplitude histograms based on the rotated signals output by rotation module 85, and histogram evaluation module 95 evaluates the amplitude histograms. As detailed below, second estimation module 80 is an optional element that may be used in certain circumstances. Histogram generation module 90 and histogram evaluation module 95 may be implemented in substantially the same manner as described above for histogram generation module 70 and histogram evaluation module 75.

The elements of CD estimator 50 may generally be implemented in digital logic gates in one or more application-specific integrated circuits (ASICs). However, in an alternative arrangement, certain elements of CD estimator 50 may be implemented as one or more software modules stored in memory 56 that are executable by a processor, such as controller 55. That is, in such an arrangement, controller 55 may perform the histogram generation and evaluation operations (including cost function generation) described herein. To this end, memory 56 may comprise read only memory (ROM), random access memory (RAM), magnetic disk storage media devices, optical storage media devices, flash memory devices, electrical, optical, or other physical/tangible memory storage devices. The controller 55 is, for example, a microprocessor or microcontroller that executes instructions for process logic stored in memory 56 to enable the controller 55 to perform the histogram generation and evaluation operations described herein. Thus, in general, the memory 56 may comprise one or more computer readable storage media (e.g., a memory device) encoded with software comprising computer executable instructions and when the software is executed (by the controller 55) it is operable to perform the histogram generation and evaluation operations described herein.

Figure 2:
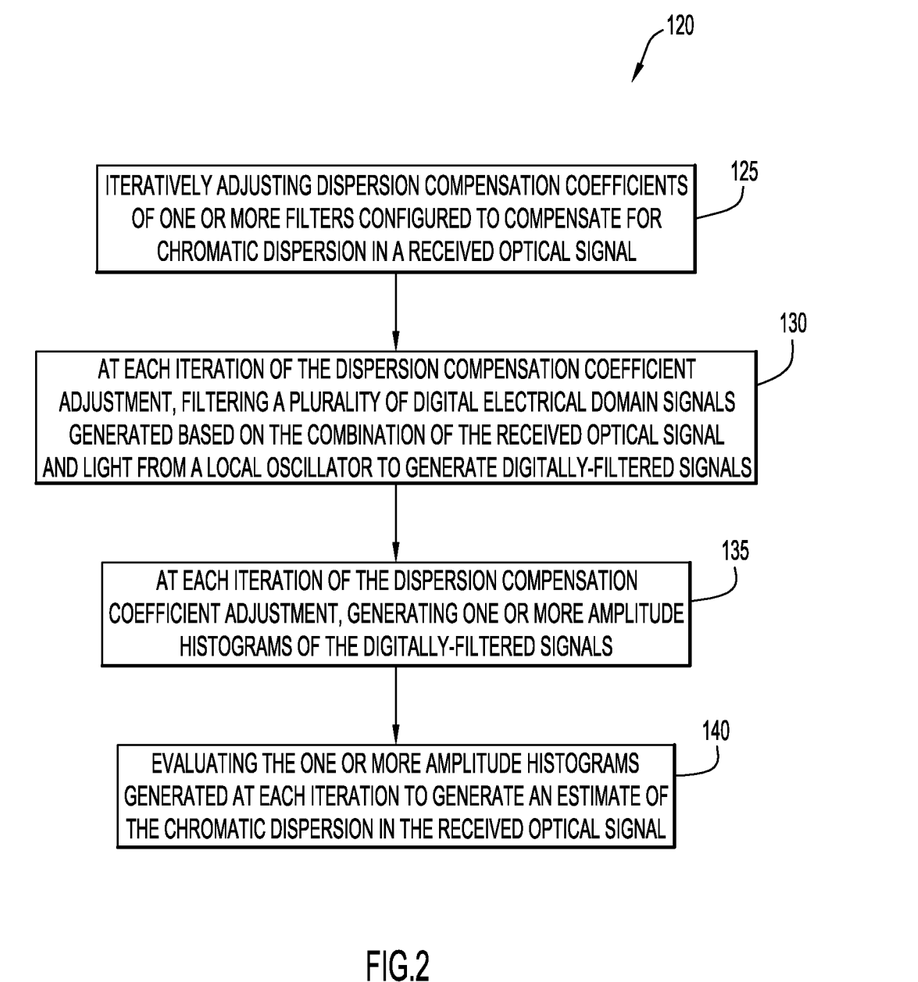
FIG. 2 is a high level flowchart of a histogram-based method for estimating the CD in a received optical signal.

FIG. 2 is a high level flowchart illustrating a histogram-based method 120 for estimating the CD in a signal received by an optical receiver. At 125, the dispersion compensation coefficients of the one or more filters configured to compensate for the CD in the received optical signals are iteratively adjusted. At 130, at each iteration of the coefficient adjustment, a plurality of digital electrical domain signals generated based on the combination of the received optical signals and light from a local oscillator are filtered to generate digitally-filtered signals.

At 135, at each iteration of the dispersion compensation coefficient adjustment, histograms of the amplitudes of the digitally-filtered signals are generated. Further details regarding the generation of these amplitude histograms are provided below. At 140, the histograms generated at each iteration are evaluated to generate an estimate of the CD in the received optical signal.

A histogram is a function that counts the number of observations or occurrences that fall into each of a number of disjointed categories, commonly referred to as bins. As noted above, in the example of FIG. 1, histogram generation module 70 generates histograms of the amplitudes of signals 67(1)-67(4) received from digital filters 66(1)-66(4) in CD compensator 45.

Figure 3A:
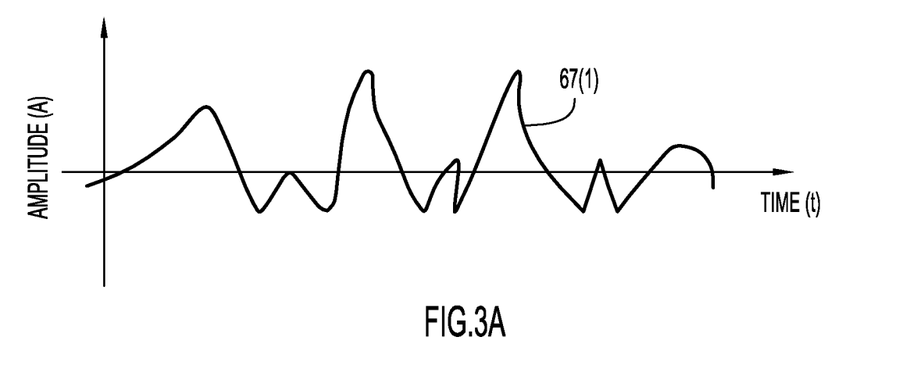
FIGS. 3A and 3B are graphs illustrating examples of the generation of a histogram during an example histogram-based CD estimation technique.

FIG. 3A is a graphical representation of the amplitude (A) of an example received optical signal XI, signal 67(1), versus time. As shown, the amplitude of the signal 67(1) varies with time and may have positive and negative values. A plurality of samples (observations) of the amplitude of signal 67(1) are obtained over a selected or predetermined time period, and these samples are used to generate an amplitude histogram.

Figure 3B:
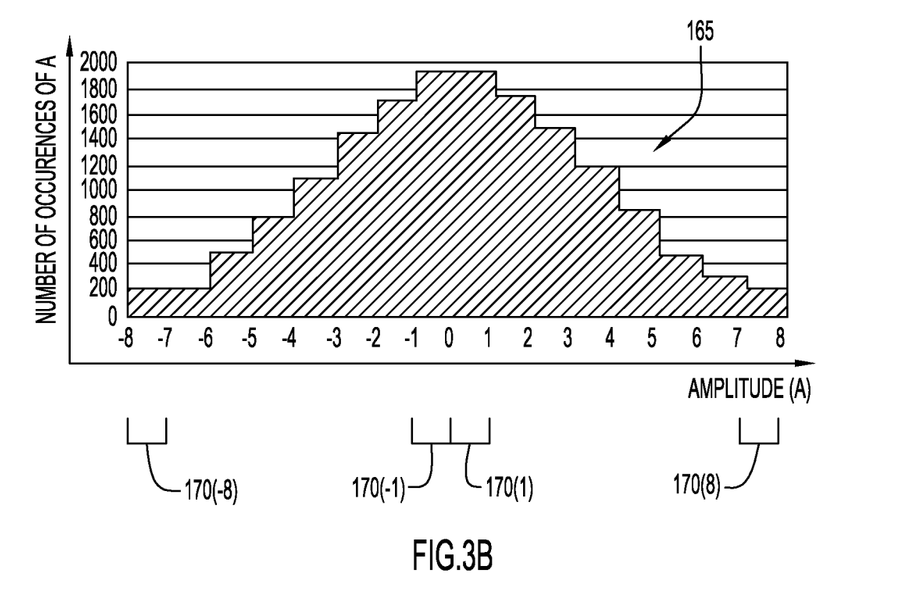

Histograms are functions, but may be generally represented by a graph. FIG. 3B is a graphical representation of the histogram generated using the sampled amplitudes of signal 67(1), and is referred to at reference numeral 165. To generate histogram 165, the samples of the amplitude of signal 67(1) are classified into one of a plurality of bins 170(−8) to 170(8) that each represents a range of values for the signal amplitude. As such, the X-axis of the graph of FIG. 3B is separated in the plurality of bins 170(−8) to 170(8), and the Y-axis of the graph is the number of occurrences of the sampled amplitude within each bin.

In the example of FIG. 3B, the histogram contains eight bins on each side of zero, for a total of sixteen bins. For ease of illustration, only bins 170(−8), 170(−1), 170(1), and 170(8) are labeled in FIG. 3B. It is to be appreciated that the use of sixteen bins is merely illustrative and that other numbers of bins may be used. It is also to be appreciated that the bin sizes shown in FIG. 3B are merely illustrative and that other bin sizes may be used.

At each iteration of the dispersion coefficient adjustment, a plurality of samples of signals 67(1)-67(4) are obtained and classified into one of the available bins. The number of utilized samples may vary.

Figure 4A:
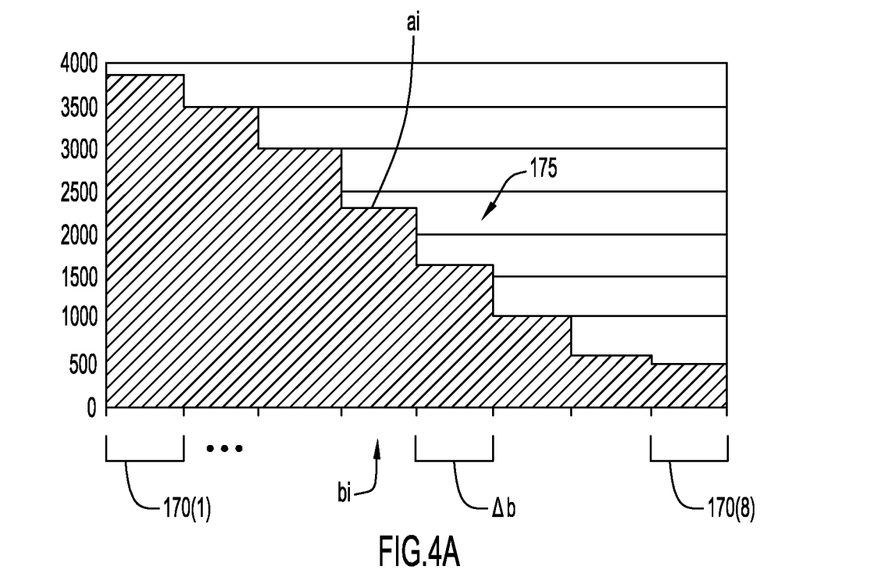
FIGS. 4A and 4B are graphs illustrating examples of the evaluation of a histogram during an example histogram-based CD estimation technique.
Figure 4B:
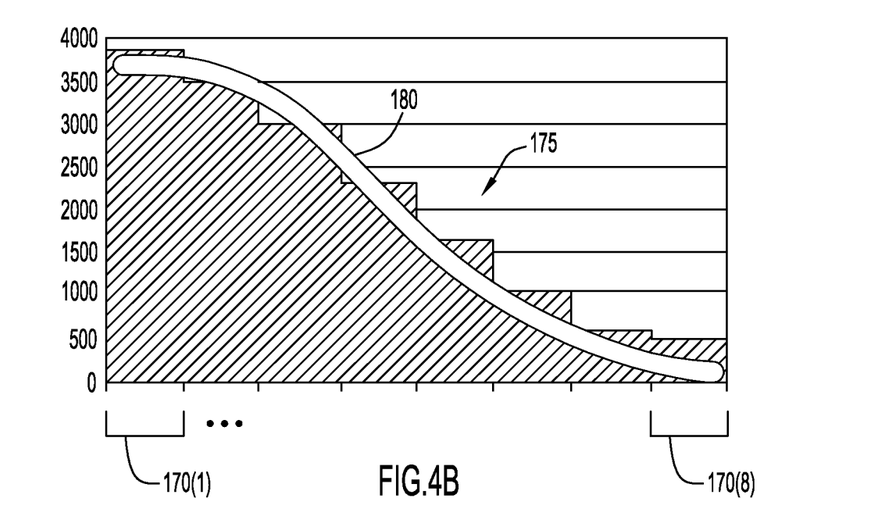

One step used in the histogram-based techniques for estimation of the CD in signal 60 is the determination of how closely the histogram distributions match a Gaussian distribution. FIGS. 4A and 4B illustrate one example technique for determining how closely the distribution of histogram 165 of FIG. 3B matches a Gaussian distribution.

The amplitudes of signal 67(1) may have positive or negative values. However, the generated amplitude histogram 165 of FIG. 3B is symmetric about zero. Due to this symmetry, histogram 165 of FIG. 3 may be converted into a one-sided histogram graphically represented in FIG. 4A and labeled 175. As shown in FIG. 4A, the bins containing the negative amplitude occurrences (i.e., bins 170(−1) to 170(−8)) are removed, while the contents of the bins containing the positive amplitude occurrences (i.e., bins 170(1) to 170(8)) are modified accordingly. That is, the contents of each of the positive bins are increased to account for the negative amplitude occurrences that were removed.

As graphically shown in FIG. 4B, the distribution of the one-side histogram 175 is compared to a one-sided Gaussian distribution 180, which is referred to herein as the Gaussian fit. The values of the Gaussian distribution 180 are given below by Equation (1).

$$g_i = \sqrt{\frac{\eta^3}{\sigma^2 \cdot 2\pi}} \exp\left(-\frac{\eta}{2}\frac{b_i^2}{\sigma^2}\right), \quad \text{Equation (1)}$$

with $\eta = 2 \cdot \Delta b \cdot \sum_i a_i$, and $$\sigma^2 = 2 \cdot \Delta b \cdot \sum_i (b_i^2 a_i),$$

where, as shown in FIG. 4A, $b_i$ are the bin values and $\Delta b$ is the bin size.

Subsequently, a cost function is applied that sums the differences between the histogram distribution and the Gaussian distribution (i.e., provides a numerical value representing the Gaussian fit). Equation (2), below is an example of the utilized cost function.

$$C = \sum_i |a_i - g_i| \qquad \text{Equation (2)}$$

In equation (2), $a_i$, are the bin heights, and $g_i$ is given above by Equation (1).

It should be noted that the summation (sigma) depends only on the power of the signal, as CD compensation does not change the signal's power. If the power of the signal is known or fixed, the calculation of the Gaussian fit can be done upfront, which decreases the computational complexity of the CD estimation operations.

FIGS. 5A-5D are examples graphically illustrating histogram distributions with respect to a Gaussian distribution 190. In these examples, the amount of CD in the signal received by the receiver is known, and the graphs illustrate how the histograms deviate from the Gaussian distribution with different amounts of CD. As noted above, FIG. 3B graphically illustrates a histogram using the number of occurrences on the Y-axis. FIGS. 5A-5D graphically illustrate histograms using arbitrary units (a.u.) as the Y-axis.

Additionally, FIG. 3B graphically illustrates a histogram using bins having a value range. In FIGS. 5A-5D, the bins are values (i.e., 0, 0.5, −0.5, 1, −1, etc.) and the occurrences are classified by rounding to the nearest one of these values. For example, an amplitude occurrence of 0.3 may be rounded and classified into the 0.5 bin, while an occurrence of 0.2 may be rounded and classified into the 0 bin.

Figure 5A:
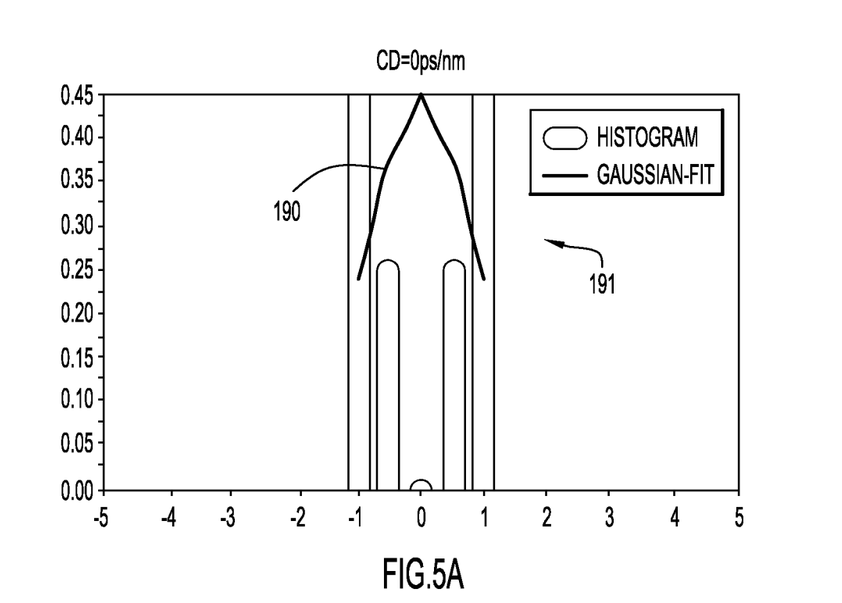
FIGS. 5A-5D are graphs illustrating examples of the deviation of the distribution of histograms from a Gaussian distribution.

FIG. 5A is an example of a histogram distribution in which the received data signal has a symbol-rate of 10 gigabaud (Gbaud) and the amount of CD in the sampled signal is known to be approximately zero ps/nm. Because there is substantially no CD in the sampled signal, histogram 191 has a distribution that greatly deviates from Gaussian distribution 190. As such, use of a cost function as described above to quantify this deviation would lead to a relatively high numerical value.

Figure 5B:
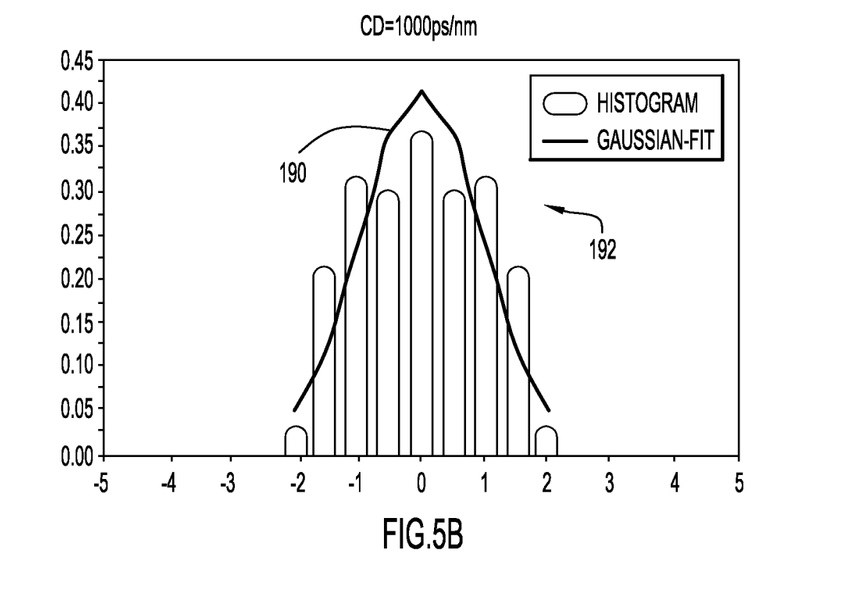

FIG. 5B is an example of a histogram distribution in which the received data signal has a symbol-rate of 10 Gbaud and the amount of CD is known to be approximately 1000 ps/nm. As shown, when the distribution of histogram 192 is compared to Gaussian distribution 190, the histogram will still significantly deviate from the Gaussian distribution, but the deviation is less than the deviation of FIG. 4A.

Figure 5C:
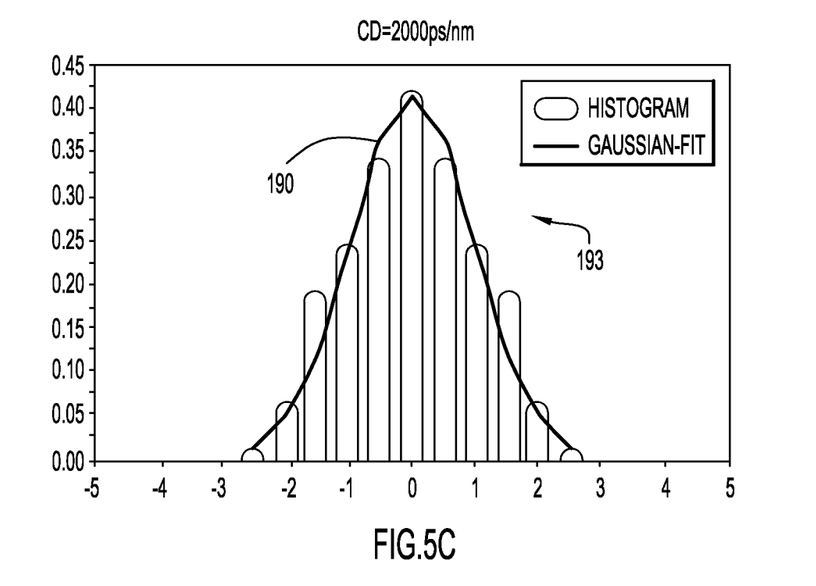
Figure 5D:
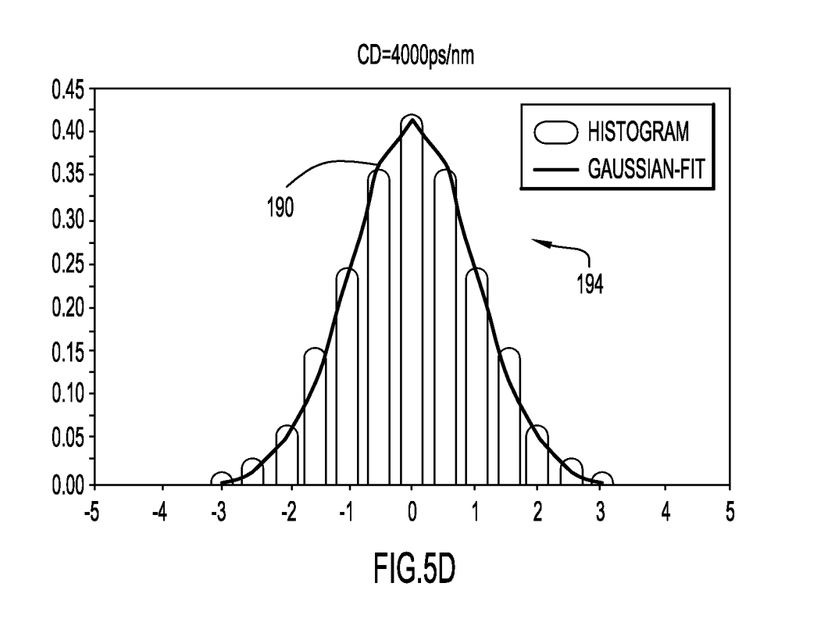

FIGS. 5C and 5D are examples of histogram distributions in which the received data signal has a symbol-rate of 10 Gbaud and the amount of CD in the signal is known to be approximately 2000 ps/nm, and 4000 ps/nm, respectively. As shown, when histograms 193 and 194 are compared to Gaussian distribution 190, there is little deviation. However, the deviation of FIG. 5C is still greater than the deviation of FIG. 5D. As such and as noted above, as the CD in the sampled signal increases, the distribution of the histograms will more closely match the Gaussian distribution.

Figure 6:
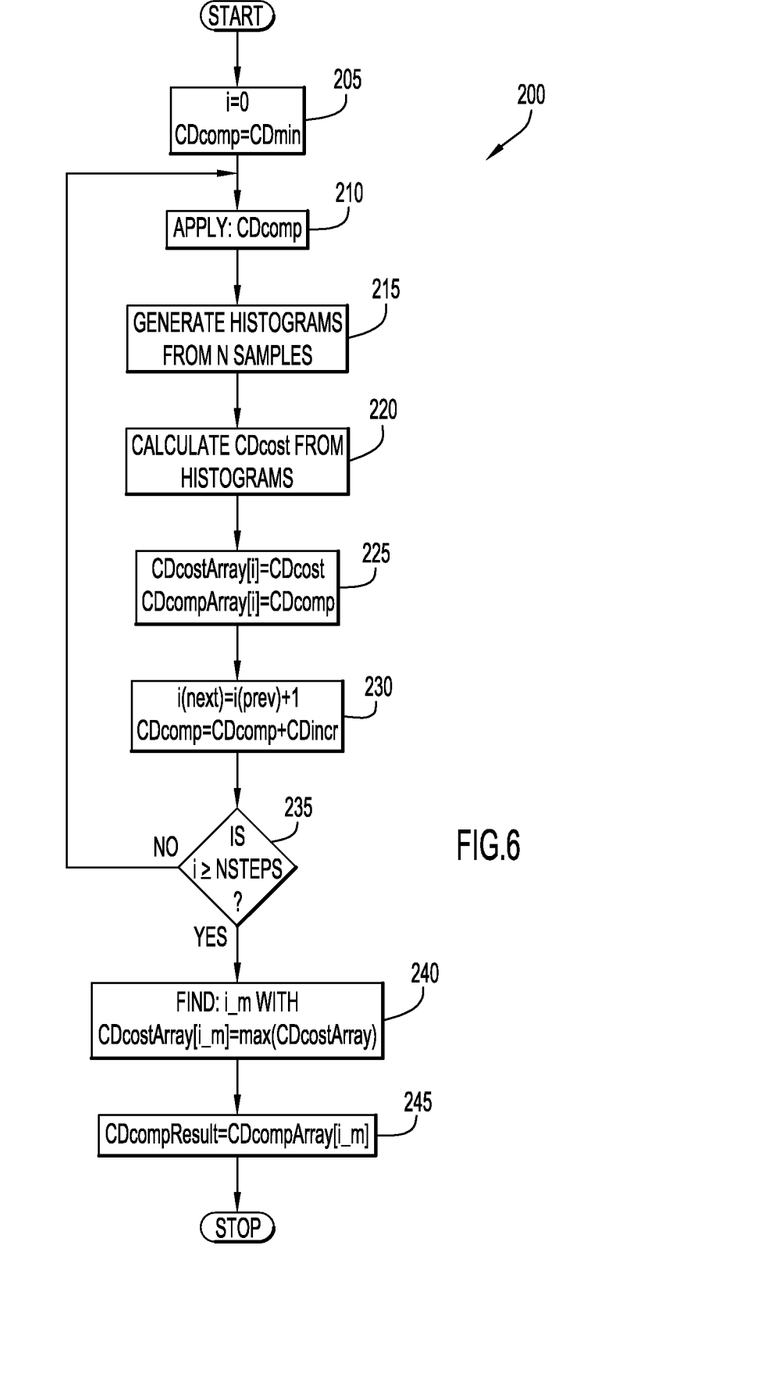
FIG. 6 is a detailed flowchart showing examples of operations of a histogram-based method for estimating the CD in a received optical signal.

FIG. 6 is a detailed flowchart of a histogram-based method 200 for estimating the CD in a signal received by an optical receiver. For ease of illustration, the method 200 is described with reference to the example optical receiver configuration of FIG. 1.

In accordance with techniques described herein, the histogram-based method for estimating CD in received signal 60 is an iterative process. As such, method 200 begins at 205 with a first iteration (i), represented by i=0. At this first iteration, the dispersion compensation coefficients of filters 66(1)-66(4) are set to a first predetermined level. The level of the dispersion compensation coefficients are represented as CDcomp, and the first predetermined level for CDcomp is a minimum level represented as CDmin. Therefore, at 205 CDcomp=CDmin.

At each iterative adjustment, the dispersion compensation coefficients are configured such that CD compensator 45 compensates for different amounts of CD in the digital signals. That is, each level of the dispersion compensation coefficients is configured to enable CD compensator 45 to compensate for a predetermined amount of CD (e.g., a first level compensates for 1000 picoseconds/nanometer (ps/nm), while a second level compensates for 2000 ps/nm). As such, the levels of the dispersion compensation coefficients may be expressed in terms of the amount CD for which the coefficients are configured to compensate. CDmin may comprise, for example, −4000 ps/nm (i.e., at CDmin, the filter coefficients are configured to compensate for a CD of −4000 ps/nm).

At 210, the CDcomp is applied to a signal by filters 66(1)-66(4) of CD compensator 45. That is, filters 66(1)-66(4) filter an incoming signal using the first iteration of the coefficients (i.e., CDmin). At 215, a plurality of (N) samples are obtained from each of the digitally filtered signals 67(1)-67(4) output by CD compensator 45, and the N samples are used to generate histograms of the amplitudes of signals 67(1)-67(4). At 220, the distributions of the generated histograms are compared to a Gaussian distribution. One or more cost functions are used to generate numerical values representing the deviation of the histogram distributions from the Gaussian distribution. The numerical values are represented by CDcost.

At 225, the accumulation of all the CDcosts, referred to as the CDcostArray, is updated to include the numerical values generated at 220. Each element of the CDcostArray corresponds to a single iteration. As such, the numerical value generated with a particular CDcomp is referred to as CDcostArray(i), where i is the iteration at which the numerical value was generated. An array of the CD compensation applied at each iteration may also be generated and referred to as CDcompArray. The compensation at one iteration is referred to as CDcompArray(i), where i is the iteration at which the compensation was applied.

At 230, the dispersion compensation coefficients of the filters 66(1)-66(4) in CD compensator 45 are adjusted by one iteration, leading to a new iteration of i(next)=i(prev)+1. In other words, the new CDcomp is set equal to the previous CDcomp plus an incremental increase (CDincr) in the filter coefficients so as to compensate for a new level of CD (i.e., CDcomp(next)=CDcomp(prev)+CDincr).

As previously noted, to estimate the CD in the received signal 60 and thus select the proper dispersion compensation coefficients for filters 66(1)-66(4), the method 200 iteratively generates histograms using different filter coefficients. More specifically, to obtain the different histograms, the method 200 starts with a minimum CD compensation (CDmin) and iteratively proceeds through a range of CD compensations until a maximum CD compensation (CDmax) is reached. A number of discrete steps (Nsteps) are used between CDmin and CDmax, and each of these steps are separated by CDincr. At 235, a check is performed to determine if the iteration (i) is less than the Nsteps separating CDmin from CDmax. If i is less than Nsteps, method 200 repeats steps 210, 215, 220, 225 and 230. This continues until i is equal to Nsteps.

Once i is equal to Nsteps, method 200 proceeds to 240 where the maximum of the CDcostArray is determined. At 245, the determined maximum of CDcostArray is used to estimate the CD in the received signal, and to set the dispersion compensation coefficients of filters 66(1)-66(4) to the level that compensates for the estimated CD.

Figure 7:
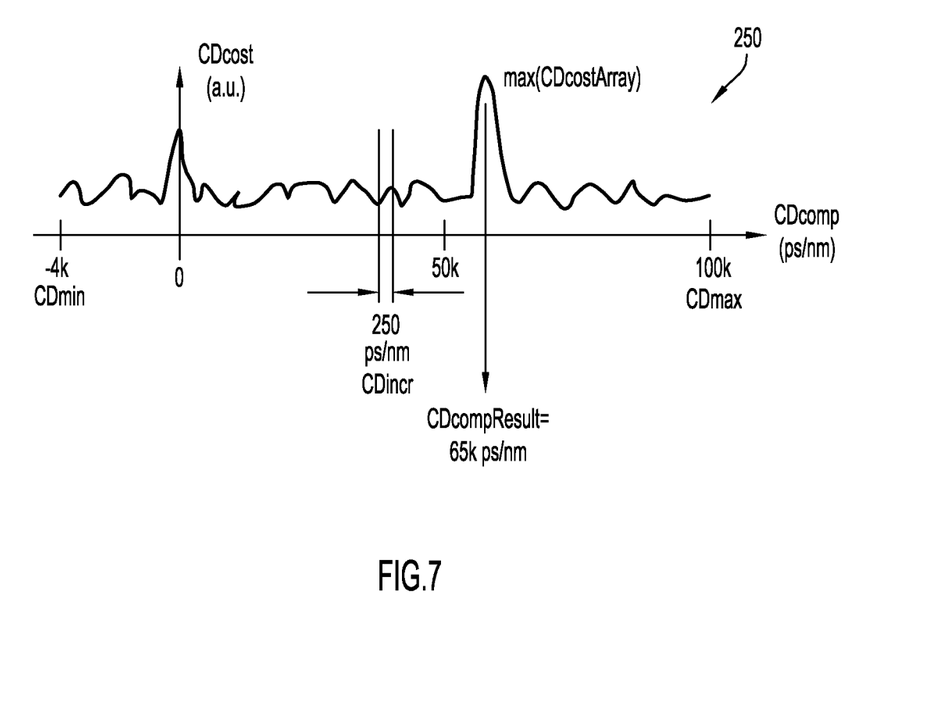
FIG. 7 is a graph showing an example of a cost function used during an example histogram-based CD estimation technique.

FIG. 7 is a graph of a CDcostArray 250 generated in accordance with one example of FIG. 6. In this example, CDmin is equal to −4,000 ps/nm, CDmax is equal to 100,000 ps/nm, and CDincr is 250 ps/nm. The number of samples used at each iteration (Nsmpl) is approximately 4096.

The number or iterations or steps (Nsteps) is given below by Equation (3).

$$Nsteps = \frac{CD\max - CD\min}{CDincr} + 1 \qquad \text{Equation (3)}$$

As such, applying the values of FIG. 7 in Equation (3), Nsteps is equal to 417.

The maximum of CDcostArray 250 (max(CDcostArray)) is the location at which the CDcostArray has a maximum value. In this example, the maximum of the CDcostArray 250 is determined to be at 65,000 ps/nm. As such, the estimate of the CD in the received signal is determined to be 65,000 ps/nm, and the dispersion compensations coefficients of the filters 66(1)-66(4) in CD compensator 45 are set to levels that are configured to compensate for 65,000 ps/nm. This may be completed, for example, by correlating the maximum value with the CDcompArray generated above in FIG. 6.

It is to be appreciated that the value for CDincr given above is merely illustrative, and that different values for CDincr may be used. The size of CDincr may depend on, for example, the data rate. The CDincr is selected so that potential maximums will not be skipped during the iterative process.

As shown in the example of FIG. 7, the CDcostArray has a peak at 0 ps/nm. This peak is a result of the clipping of the ADCs 40(1)-40(4). In circumstances in which there is a peak at zero and another peak (i.e., at 65,000 ps/nm), the peak with the highest CD amount is selected as the maximum. Alternatively, the peak at 0 ps/nm (zero-peak) may be reduced by applying a correction value to the cost-function vector, which takes into account the systematic height of the zero-peak.

In certain circumstances, the maximum of CDcostArray 250 may have a peak that is of a relatively low value (little contrast) and may therefore be difficult to identify as the peak. A simple solution to increase the visibility of the maximum is to evaluate the "Gaussianity" of digitally-modified versions of signals 67(1)-67(4). As noted above with reference to FIG. 1, one method for digitally modifying signals is to rotate the polarization of signals 67(1)-67(4) (i.e., rotation module 85). More specifically, an additional digital amount of polarization rotation, e.g., 45° polarization rotation, may be applied to signals 67(1)-67(4). By generating histograms based on these rotated signals, and evaluating the "Gaussianity" of the histogram distributions, a more observable cost function peak may be created. In such cases, the overall cost-function is produced by the sum of the rotated and the original evaluation. The rotated evaluation is performed by optional second estimation module 80 of FIG. 1.

As previously noted, in the example of FIG. 1, second estimation module 80 comprises a rotation module 85, a histogram generation module 90, and a histogram evaluation module 95. Also as noted above, rotation module 85 is merely an example of a module that digitally modifies signals 67(1)-67(4) to obtain better contrast of the cost-function-peak. Other calculations (e.g. attenuation of one polarization or addition of DGD-effects) might also be helpful to increase the contrast and may be used in place of, or in combination with, the polarization rotation described above.

Figure 8:
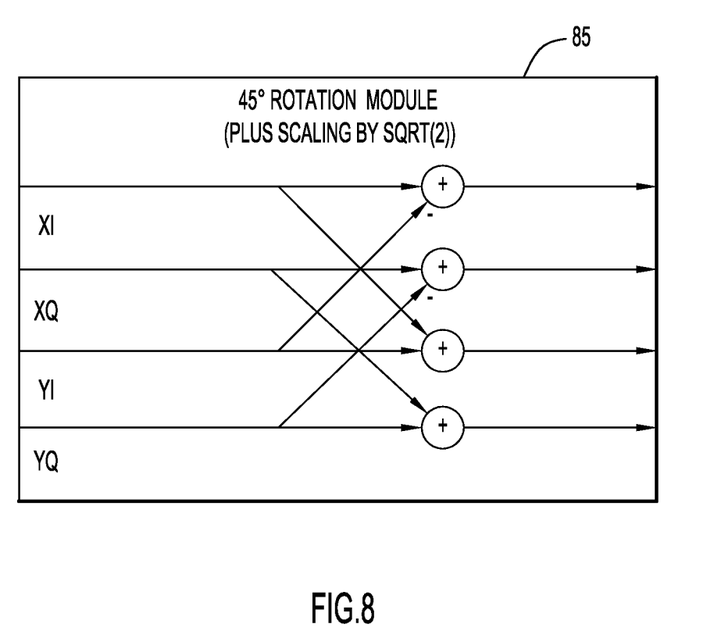
FIG. 8 is a diagram depicting a polarization rotation operation used in an example histogram-based CD estimation technique.

FIG. 8 is a graphical illustration of one implementation of rotation module 85. As shown, rotator 85 receives the four signals from CD compensator 45, rotates the signals by a predetermined polarization amount, e.g., 45 degrees, and performs scaling operations. The rotated signals may then be supplied to histogram generation module 90 to generate histograms in substantially the same manner as described above for histogram generation module 70. Similarly, the Gaussian distribution of these generated histograms may be evaluated by histogram evaluation module 95 in substantially the same manner as described above for histogram evaluation module 75. As noted, the overall cost function for estimating the CD in received signal 60 is generated based on the results of the primary evaluation described above for histogram evaluation module 75, as well as this secondary evaluation of histogram evaluation module 95.

As noted above, the techniques described herein for estimating CD in a received signal use the iterative generation and evaluation of histograms. The generation of histograms is of very low complexity as it only incorporates increasing histogram bins based on received samples. As such, the generation and evaluation operations have low computational demands and may be performed relatively quickly. Additionally, the histogram-based techniques described above operate with synchronous and asynchronous samples.

The above description is intended by way of example only.

What is claimed is:

1. A method comprising:
   iteratively adjusting dispersion compensation coefficients of one or more filters configured to compensate for chromatic dispersion in a received optical signal;
   at each iteration of the dispersion compensation coefficient adjustment, filtering a plurality of digital electrical domain signals generated based on the received optical signal;
   at each iteration of the dispersion compensation coefficient adjustment, generating one or more amplitude histograms of the digitally-filtered signals; and
   evaluating the one or more amplitude histograms generated at each iteration to generate an estimate of the chromatic dispersion in the received optical signal by:
   determining a deviation of a distribution of the amplitude histograms generated at each iteration from a Gaussian distribution,
   comparing the deviations using a cost function, and
   generating an estimate of the chromatic dispersion in the received optical signal based on a maximum of the cost function.

2. The method of claim 1, further comprising:
   based on the estimate of the chromatic dispersion, identifying values for the dispersion compensation coefficients configured to enable the filters to substantially compensate for the chromatic dispersion in the received optical signal.

3. The method of claim 1, wherein iteratively adjusting the dispersion compensation coefficients comprises:
   initially setting the dispersion compensation coefficients to values that enable the filters to compensate for a predetermined minimum amount of chromatic dispersion; and
   iteratively adjusting the dispersion compensation coefficients by a predetermined amount until the dispersion compensation coefficients are at values that enable the filters to compensate for a maximum predetermined amount of chromatic dispersion.

4. The method of claim 1, further comprising:
   at each iteration, digitally-modifying the digitally-filtered signals to generate digitally-modified signals;

at each iteration, generating amplitude histograms of the digitally-modified signals; and wherein evaluating comprises evaluating the amplitude histograms generated at each iteration based on the digitally-filtered signals and the amplitude histograms generated at each iteration based on the digitally-modified signals to generate an estimate of the chromatic dispersion in the received optical signal.

5. The method of claim 4, wherein digitally modifying the signals comprises:
rotating a polarization of the digitally-filtered signals by a predetermined amount.

6. The method of claim 5, wherein rotating the polarization of the digitally-filtered signals by a predetermined amount comprises:
rotating the polarization of the digitally-filtered signals by 45 degrees.

7. The method of claim 1, wherein evaluating the one or more histograms generated at each iteration further comprises:
at each iteration, generating a one-side histogram corresponding to the one or more amplitude histograms;
determining a deviation of a distribution of the one-sided histograms generated at each iteration from a Gaussian distribution;
comparing the deviations using a cost function; and
generating an estimate of the chromatic dispersion in the received optical signal based on a maximum of the cost function.

8. An apparatus comprising:
one or more filters each configured to compensate for chromatic dispersion in a received optical signal based on dispersion compensation coefficients, wherein the filters are configured to filter a plurality of electrical domain signals generated based on the received optical signal to generate digitally-filtered signals;
a controller configured to iteratively adjust the dispersion compensation coefficients of the one or more filters so that at each iteration of dispersion compensation coefficient adjustment, the filters generate the digitally-filtered signals from different dispersion compensation coefficients; and
a chromatic dispersion estimator configured to, at each iteration of the dispersion compensation coefficient adjustment, generate one or more amplitude histograms of the digitally-filtered signals, and evaluate the one or more amplitude histograms generated at each iteration to generate an estimate of the chromatic dispersion in the received optical signal,
wherein to evaluate the amplitude histograms the chromatic dispersion estimator is configured to determine a deviation from a Gaussian distribution of a distribution of the amplitude histograms generated at each iteration, compare the deviations based on a cost function, and generate an estimate of the chromatic dispersion in the received optical signal based on a maximum of the cost function.

9. The apparatus of claim 8, wherein the chromatic dispersion estimator is configured to identify values for the dispersion compensation coefficients configured to enable the filters to substantially compensate for the chromatic dispersion in the received optical signal based on the estimate of the chromatic dispersion.

10. The apparatus of claim 8, wherein to iteratively adjust the dispersion compensation coefficients the controller is configured to initially set the dispersion compensation coefficients to values that enable the filters to compensate for a predetermined minimum amount of chromatic dispersion, and iteratively adjust the dispersion compensation coefficients by a predetermined amount until the dispersion compensation coefficients are at values that enable the filters to compensate for a maximum predetermined amount of chromatic dispersion.

11. The apparatus of claim 8, wherein the chromatic dispersion estimator is further configured to, at each iteration, digitally modify the digitally-filtered signals to generate digitally modified signals, generate, at each iteration, amplitude histograms of the digitally-modified signals, and to evaluate the amplitude histograms generated at each iteration based on the digitally-filtered signals and the amplitude histograms generated at each iteration based on the digitally-modified signals to generate an estimate of the chromatic dispersion in the received optical signal.

12. The apparatus of claim 11, wherein the chromatic dispersion estimator is configured to rotate a polarization of the digitally-filtered signals by a predetermined amount to generate the digitally-modified signals.

13. The apparatus of claim 12, wherein the chromatic dispersion estimator is configured to rotate the polarization of the digitally-filtered signals by 45 degrees.

14. The apparatus of claim 8, wherein the chromatic dispersion estimator is further configured to, at each iteration, generate a one-side histogram corresponding to the one or more amplitude histograms, determine a deviation of a distribution of the one-sided histograms generated at each iteration from a Gaussian distribution, compare the deviations of the one-sided histograms generated at each iteration based on a cost function, and generate an estimate of the chromatic dispersion in the received optical signal based on a maximum of the cost function.

15. The apparatus of claim 8, further comprising:
a local oscillation light source;
a hybrid optical circuit configured to mix light output from the local oscillation light source with the received optical signal, and to output one or more optical signals;
a photoelectric conversion stage configured to convert the one or more optical signals output by the hybrid optical circuit into analog electrical domain signals; and
an analog-to-digital conversion stage configured to convert the analog electrical domain signals into the digital electrical domain signals for filtering by the one or more filters.

16. One or more non-transitory computer readable storage media encoded with software comprising computer executable instructions and when the software is executed operable to:
iteratively adjust dispersion compensation coefficients of one or more filters configured to compensate for chromatic dispersion in a received optical signal;
at each iteration of the dispersion compensation coefficient adjustment, filter a plurality of digital electrical domain signals generated based on the received optical signal to generate digitally-filtered signals;
at each iteration of the dispersion compensation coefficient adjustment, generate one or more amplitude histograms of the digitally-filtered signals; and
evaluate the one or more amplitude histograms generated at each iteration to generate an estimate of the chromatic dispersion in the received optical signal, wherein the instructions to evaluate the one or more amplitude histograms comprise instructions operable to:
determine a deviation of a distribution of the amplitude histograms generated at each iteration from a Gaussian distribution, compare the deviations based on a cost function, and
generate an estimate of the chromatic dispersion in the received optical signal based on a maximum of the cost function.

17. The non-transitory computer readable storage media of claim 16, further comprising instructions operable to:
identify values for the dispersion compensation coefficients configured to enable the filters to substantially compensate for the chromatic dispersion in the received optical signal based on the estimate of the chromatic dispersion.

18. The non-transitory computer readable storage media of claim 16, wherein the instructions operable to iteratively adjust the dispersion compensation coefficients comprise instructions operable to:
initially set the dispersion compensation coefficients to values that enable the filters to compensate for a predetermined minimum amount of chromatic dispersion; and
iteratively adjust the dispersion compensation coefficients by a predetermined amount until the dispersion compensation coefficients are at values that enable the filters to compensate for a maximum predetermined amount of chromatic dispersion.

19. The non-transitory computer readable storage media of claim 16, further comprising instructions operable to:
at each iteration, digitally modifying the digitally-filtered signals to generate digitally-modified signals;
at each iteration, generate amplitude histograms of the digitally-modified signals; and
wherein the instructions operable to evaluate comprise instructions operable to evaluate the amplitude histograms generated at each iteration based on the digitally-filtered signals and the amplitude histograms generated at each iteration based on the digitally-modified signals to generate an estimate of the chromatic dispersion in the received optical signal.

20. The non-transitory computer readable storage media of claim 19, wherein the instructions operable to digitally modify the digitally-filtered signals comprise instructions operable to:
rotate a polarization of the digitally-filtered signals by a predetermined amount.

21. The non-transitory computer readable storage media of claim 20, wherein the instructions operable to rotate the polarization of the digitally-filtered signals by a predetermined amount comprise instructions operable to:
rotate the polarization of the digitally-filtered signals by 45 degrees.

* * * * *